United States Patent [19]

Hancock et al.

[11] 4,277,844
[45] Jul. 7, 1981

[54] METHOD OF DETECTING AND CORRECTING ERRORS IN DIGITAL DATA STORAGE SYSTEMS

[75] Inventors: Robert J. Hancock; William A. Burns, both of Boulder; James B. Hall, Louisville, all of Colo.

[73] Assignee: Storage Technology Corporation, Louisville, Colo.

[21] Appl. No.: 61,025

[22] Filed: Jul. 26, 1979

[51] Int. Cl.³ .............................................. G06F 11/10
[52] U.S. Cl. ........................................................ 371/38
[58] Field of Search .......................................... 371/38

[56] References Cited

U.S. PATENT DOCUMENTS

| | | | |
|---|---|---|---|
| 3,868,632 | 2/1975 | Hong et al. | 371/38 |
| 4,077,028 | 2/1978 | Lui et al. | 371/38 |
| 4,139,148 | 2/1979 | Scheuneman et al. | 371/38 |

OTHER PUBLICATIONS

Levine "Semiconductor Memory Reliability with Error Detecting and Correcting Codes" *Computer* Oct. 1976, pp. 43–50.
*Error Correcting Codes* second edition, Peterson and Weldon MIT Press (1972), pp. 206–268.

*Primary Examiner*—David H. Malzahn
*Attorney, Agent, or Firm*—Woodcock, Washburn, Kurtz, Mackiewicz & Norris

[57] ABSTRACT

An error detection and correction method for digital data storage is described which comprises horizontal and vertical generation of parity check bits. These may be used to correct errors in up to two bits per word and to indicate whether all errors in a given record have been corrected during a read operation or not. Hamming codes are used to generate check bits in a vertical direction, while cyclic redundancy codes are used in the horizontal direction. The invention is described as embodied in a solid-state memory unit utilizing charge-coupled devices for data storage.

24 Claims, 8 Drawing Figures

WRITE SEQUENCE

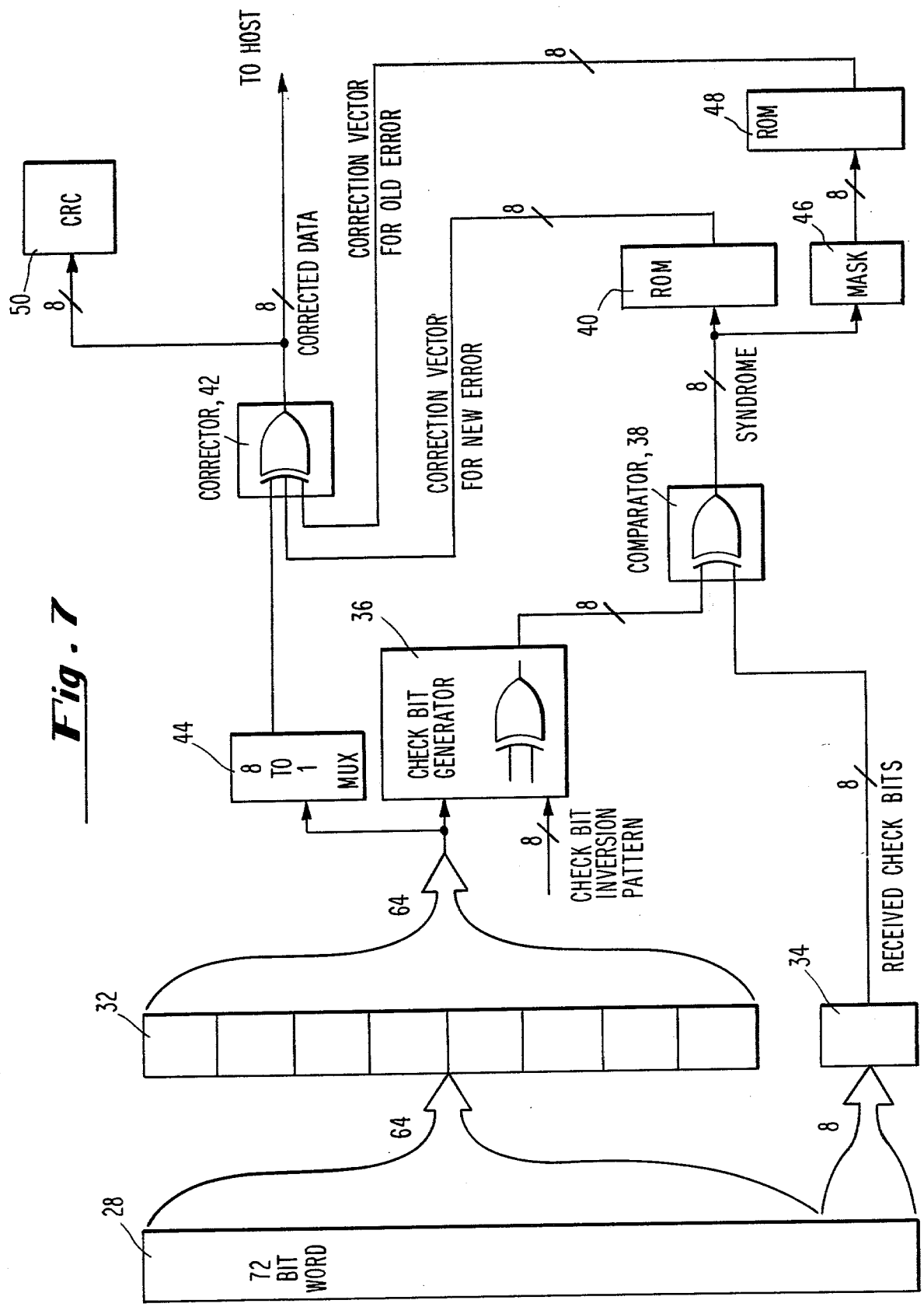

METHOD OF DETECTING AND CORRECTING ERRORS IN DIGITAL DATA STORAGE SYSTEMS

FIELD OF THE INVENTION

The present invention relates generally to the field of data storage and retrieval. More specifically, it relates to means whereby errors in the recordation or reading of said data can be detected and in many cases corrected.

BACKGROUND OF THE INVENTION

In recent years, continuing cost and performance improvements in solid state memory devices, such as charge coupled devices, as well as metal oxide semiconductor and bipolar random access memory devices, have allowed these devices to become increasingly popular for use as memory means for storing large quantities of digital data thus replacing magnetic storage means to some extent. However, these components are susceptible to failure, and have not yet reached the degree of reliability required of large memory systems. Fortunately, the organizations of these devices is such as to permit relatively low cost error detection and correction techniques which can, in many cases, be used to overcome this defect.

The specifics of organization referred to above which enable the relatively inexpensive implementation of these error detection and correction schemes are that the memory be organized in an orthogonal fashion, whereby a quantity of words of a given length (in a preferred embodiment of the present invention the word length is nine 8-bit bytes) are arranged to form records which may be on the order of 500 to 2000 words long. Thus a record may be 72 bits "high" by 1000 bits "wide". This orthogonality permits the digital data to be stored (hereinafter "information" data) to be examined at regular intervals so as to generate additional error-correction data during the writing operation to be stored along with the information data, which can later be used to determine whether or not the information data has been accurately read.

Another distinct consideration which must be faced is that there are two types of errors which are common to these solid state memory devices. In particular, there are "hard errors" wherein a single semiconductor device partially or completely, but permanently, fails, in addition to "soft" errors, which are temporary and which may occur anywhere within a given memory device and may be caused by a variety of sources. Given these two types of errors, it is clearly incumbent upon the memory system designer to devise an error detection and correction method which will correct for these two types of errors in the vast majority of cases without adding any more data storage space requirement for error correction data than the minimum necessary.

As discussed in an article "Semiconductor Memory Reliability with Error Detecting and Correcting Codes" Levine and Meyers, Computer, October 1976, page 43, the type of error correction coding most suitable for main memory is based on the Hamming single error correcting and double error detecting codes. This code involves adding redundancy to a given data field (in the present embodiment, a word). As will be explained below, a number of check bits are generated at the time of writing data into memory and are stored along with the information data to which they correspond. Upon reading the data, a similar number of check bits are again generated, according to the same algorithm originally used to generate the first group of check bits, and the thus-generated check bits are compared with the stored check bits. If they are identical, it is presumed that no errors have occurred in the read operation or in storage. If the two groups of check bits differ by a single bit, the corresponding check bit is in error. If the two groups of check bits differ by one of a number of predetermined combinations of bits, the combination of bits can be decoded to identify the location of the information bit in error. This bit can therefore be corrected by being inverted, since in a digital embodiment the only possible error is having a zero transposed into a one or vice versa. Hence, all that is required to correct an error is to identify its location. While this scheme is very useful, it has a significant limitation: it is only capable of identifying (and hence correcting) a single bit error. If a multiple bit error has occurred, this scheme can detect that fact but cannot correct it.

One improvement on this type of error correction scheme which is known is to save the location of the most recently identified error location. In this way, if the bits comprising the particular word are spread out over an equal number of individual solid state devices and if the error is due to a permanent or "hard" failure of one of the devices, the bit at this location may frequently be in error, and may be inverted. If such bit is in fact in error, a second error can then be detected and corrected according to the ordinary scheme. The difficulty with this approach is that according to this scheme the Hamming error detection means cannot tell whether two errors have been corrected or whether a multiplicity of additional errors have now been made by the inversion of these bits since, as discussed above, the error detection scheme mentioned is only capable of detecting 2 bit errors and correcting a single bit error. A number of errors in excess of one cannot be distinguished from one another, that is to say, any number of errors over one is, in the eyes of the error detection scheme discussed above, indistinguishable from any other; three errors cannot be told from 9.

OBJECTS OF THE INVENTION

It is therefore an object of the invention to provide an improved data error detection and correction method.

Another object of the invention is to provide a data error correction method which can be inexpensively implemented within a solid state memory device.

A further object of the invention is to provide a method for providing a solid state memory device with improved error detection and correction means.

Still a further object of the invention is to provide a method whereby multiple errors can be corrected and wherein the fact of their correction or not can be positively determined, as the case may be.

Yet another object of the invention is to provide an error detection scheme which includes methods for indicating whether an entire record has been read accurately or whether a multiple uncorrected error has occurred in the reading thereof.

SUMMARY OF THE INVENTION

The above needs of the art and objects of the invention are fulfilled by the present invention which comprises a method for generating error correcting codes during the writing of a record into memory and for detecting and correcting errors therein during the reading of this record from memory. In a preferred embodiment, Hamming codes are appended onto each word of data and are stored therewith as the record is being written, while at the same time a cyclic redundancy code character is being generated. At the end of the writing of a given record, the cyclic redundancy character is stored at the end of the record. During a read phase, error correction and detection methods are performed on each word stored in memory. At the end of the reading of a given record, a cyclic redundancy character check is performed which indicates whether all errors have been properly corrected, or whether multiple errors have been detected.

In a preferred embodiment, the method of the invention comprises the use of a mask register which both serves to pinpoint hard data errors and allows the correction of two errors in the same word. In a further preferred embodiment, the data is periodically purged of such errors whether or not the data has been specifically called for by a main computer.

BRIEF DESCRIPTION OF THE DRAWINGS

The invention will be better understood if reference is made to the accompanying drawings in which:

FIG. 5, comprising

FIG. 7 represents a hardware embodiment for the reading process.

DESCRIPTION OF THE PREFERRED EMBODIMENTS

The present invention as discussed above comprises a method for detecting and correcting errors in digital data. As such it was first implemented by the present inventor in connection with the fast access memory which forms the subject matter of copending patent application Ser. No. 61,026, filed July 26, 1979. The memory system described therein uses charge-coupled device (CCD) technology to store digital data. The present invention will therefore be described in terms of that implementation. However, it will be realized that other types of solid state memory can be adapted to use the error detection and correction method of the invention. In particular, random access memory (RAM) means can be adapted for implementing the present invention. The important criterion of a memory system if it is to use the present invention is that it be arranged so as to comprise records made up of words organized in parallel fashion.

Figure 1:
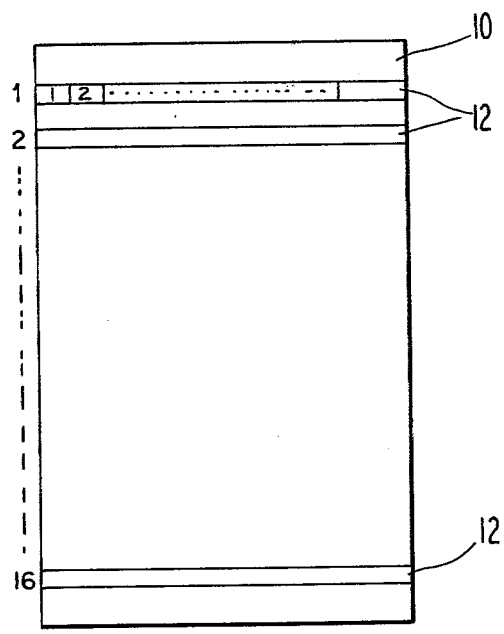
FIG. 1 represents a schematic view of a solid state device useful in the practice of the invention.

Referring now to FIG. 1, an exemplary CCD storage device 10 is shown comprising a number of loops 12. A particularly preferred CCD device made by Texas Instruments comprises 16 such loops 12 each of which comprises 4096 bits of digital data. In the fast access memory referred to above, these CCD devices 10 are organized in an array, shown in FIG. 2, 72 devices deep by 24 devices wide for a total of 1728 CCD chips. As shown along the left side of FIG. 2, the word length is 72 chips, that is to say, each word comprises 72 bits, one bit being inserted into one chip. In a preferred embodiment, each bit is in the same location in its chip as are all the other bits of the same word. That is, the chips are synchronized and each of the bits of a given word are read into the same loop 12 of each chip of one of the 24 columns simultaneously, so that the chips may be referred to as operating in parallel.

Figure 2:
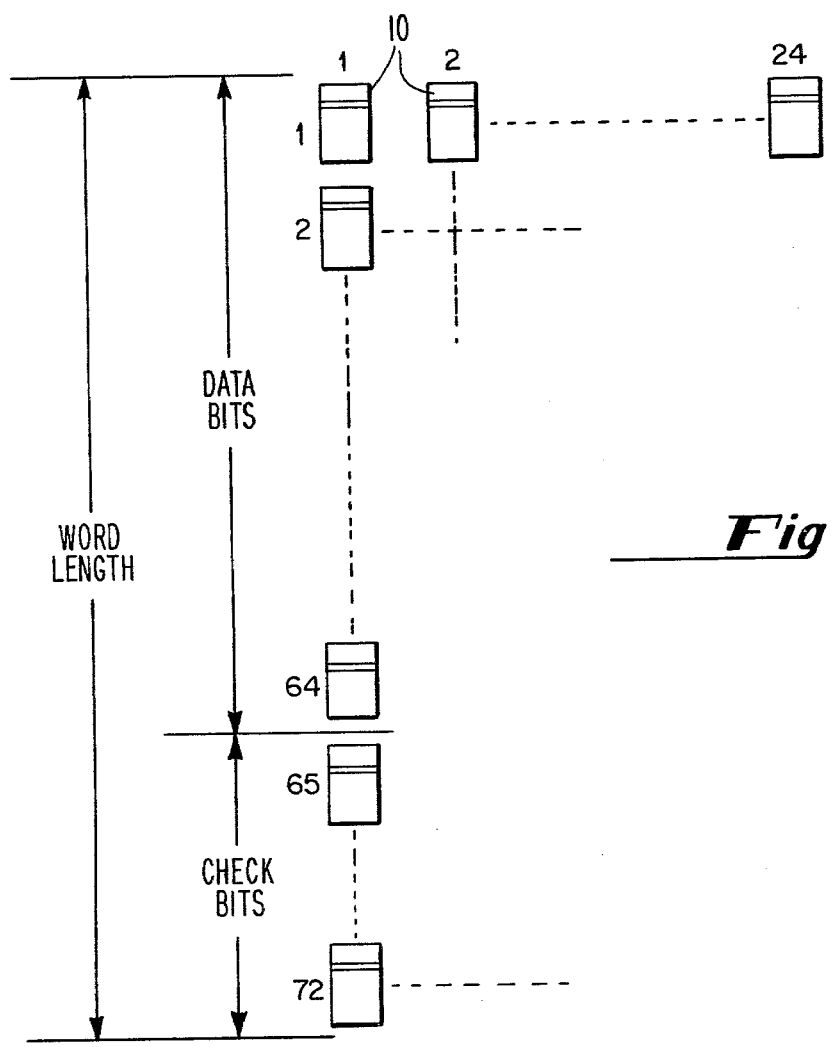
FIG. 2 represents a preferred method of arranging such solid state devices in an array useful in the practice of the process of the invention.

It will also be noted that along the left side of FIG. 2 the word length of 72 bits has been subdivided into 64 data bits and 8 check bits. The check bits are generated according to a scheme which will be discussed in further detail below, and which may comprise an implementation of the so-called Hamming error correction code. A word according to the present invention may thus comprise 64 data bits and 8 check bits; although it will be understood by those skilled in the art that other arrangements are possible. In general, the longer a given word is, the less of it is required for overhead (i.e. the less additional space is required to store error correction bits.) This is fully discussed in the article by Levine and Meyers referred to above. Further, it will be understood by those skilled in the art that in some circumstances it may be desirable to organize the 64 data bits into 8-bit bytes for convenience in various other processing operations.

As shown in FIG. 2, each of the 72 bits of a given word (indicated along the left side of FIG. 3) are written into or read from a different solid state device 10. Of these 72 bits, 64 are data bits and 8 are check bits generated at the time of writing the data into the solid state devices 10.

Figure 3:
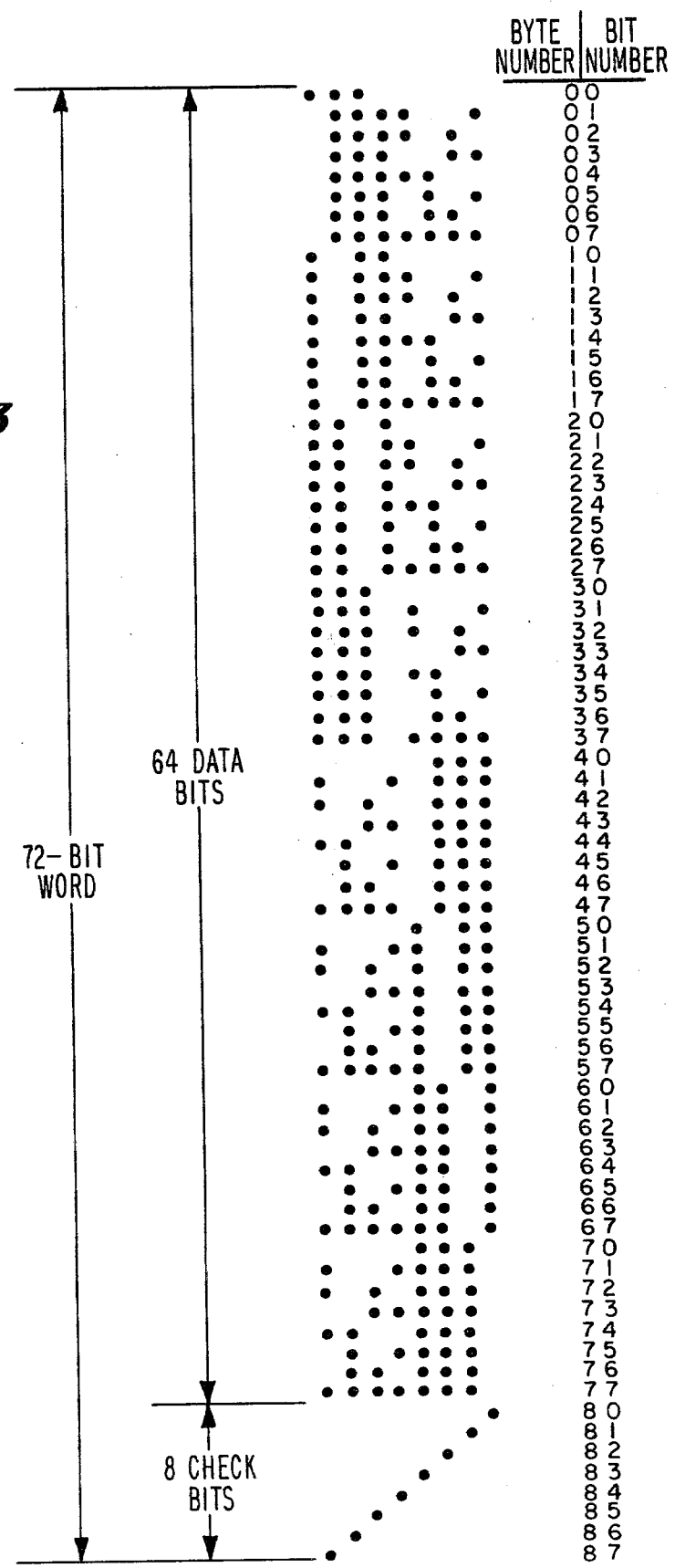
FIG. 3 represents a syndrome chart whereby error correction bits are assigned to words.

The check bits are generated according to the chart shown in FIG. 3, which is a so-called "syndrome chart". It will be observed that the error correction code or check bit generation pattern is repetitive by byte with the various rows generated by 5 combinations of bit parities within the byte. For a 64-bit data word, the 8 check bits are generated by the odd parity of all data bits indicated by an circle in the appropriate row. That is, each of the 64 data bits has a unique combination of check bits associated with it. By summing over the parity bits generated, a unique check bit scheme can be generated, which is stored during the write operation. During read, 8 new check bits are generated, and compared with the stored check bits. If they are the same, no errors have occurred; if they differ by an odd number of bits, this fact can in turn can be used to indicate the location of the error in the 64 data bits. It will be appreciated that 8 check bits can be arranged in 256 unique patterns, which is of course more than enough to indicate 64 specific locations. The generation of the specific location of an error can be performed by accessing a read only memory (ROM) according to means well known in the art; alternatively a logical algorithm could be performed in order to generate the location of the bit in error from the indication provided by the check bit comparison, which in either case would simply be inverted.

Figure 4:
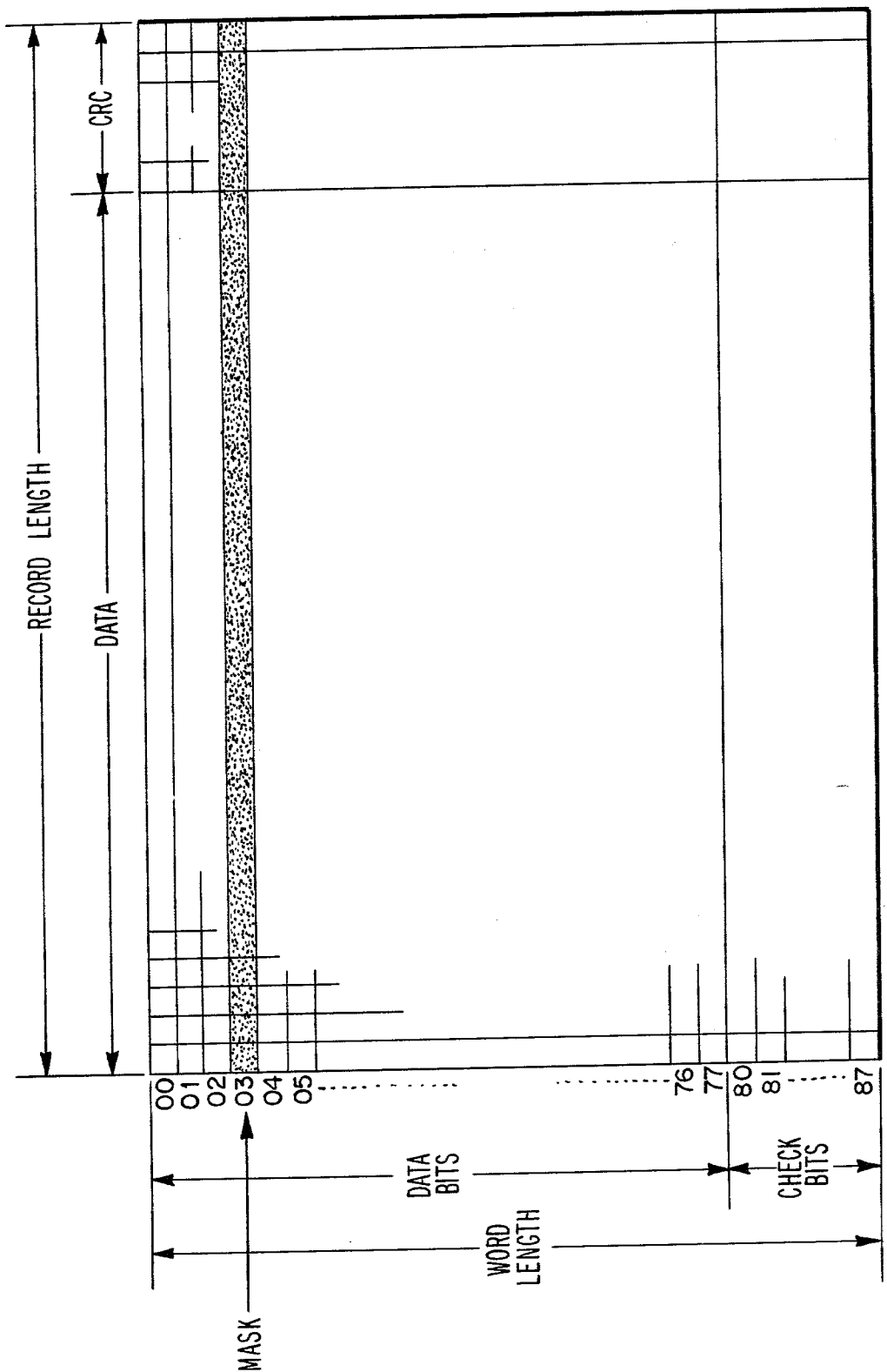
FIG. 4 represents the typical layout of a data record according to the invention.

Referring now to FIG. 4, the overall structure of a record according to the invention is shown. Individual words which comprise, as discussed above, 64 data bits and 8 error correction or check bits are indicated vertically, while the total record extends horizontally in FIG. 4. The bits of adjacent words are desirably stored in spaced apart cells of the same loops of each memory device, as discussed in copending application Ser. No. 61,026, referred to above Data comprises the vast majority of the length of the record, and cyclic redundancy check (CRC) bits, to be discussed further below, comprise the remainder. In a preferred embodiment, the cyclic redundancy check bits comprise 5 bytes, that is to say, 40 bits per record. Since in a preferred embodiment the length of a record may be as great as 2000 words, it will be apparent that the addition of the 5 bytes or 40 bits of CRC data to the record adds a small percentage of additional overhead to the length of the record.

The orthogonal arrangement of the check bits and of the CRC bits is a unique and important aspect of the invention. By means of this orthogonal arrangement, it is possible to detect whether an error is corrected according to the method of the invention (which will be discussed in further detail below) or whether the errors are multiple such as not to be correctable by the method of the invention. In either case, valuable information is provided to the remainder of the computing system within the memory system is used, or to its operator.

The CRC bits may be generated according to any one of a number of well known prior art schemes, as discussed in detail in chapter 8 of *Error Correcting Codes*, second edition, Peterson and Weldon, published by the MIT Press (1972). In a preferred embodiment, the CRC bytes comprise the remainder of a polynomial division process performed over the data in the record during the write operation. During the read operation, a similar division process is carried out on the entire record, including the remainder which was stored in the CRC bytes. If the remainder from the division performed during the read operation is zero, it is then clear that no errors have occurred; if it is non-zero, then it is clear that an error has not been corrected.

It will be observed that FIG. 4 also shows an arrow marked "MASK" and that one of the 64 bits has been marked across the length of the record. This is meant to indicate that the particular chip in which that bit is stored is bad permanently; a "mask" register is used to indicate the location of this bad device or chip. The significance of the mask register will be apparent in the discussion of the error correction method of the invention which follows.

Figure 5A:
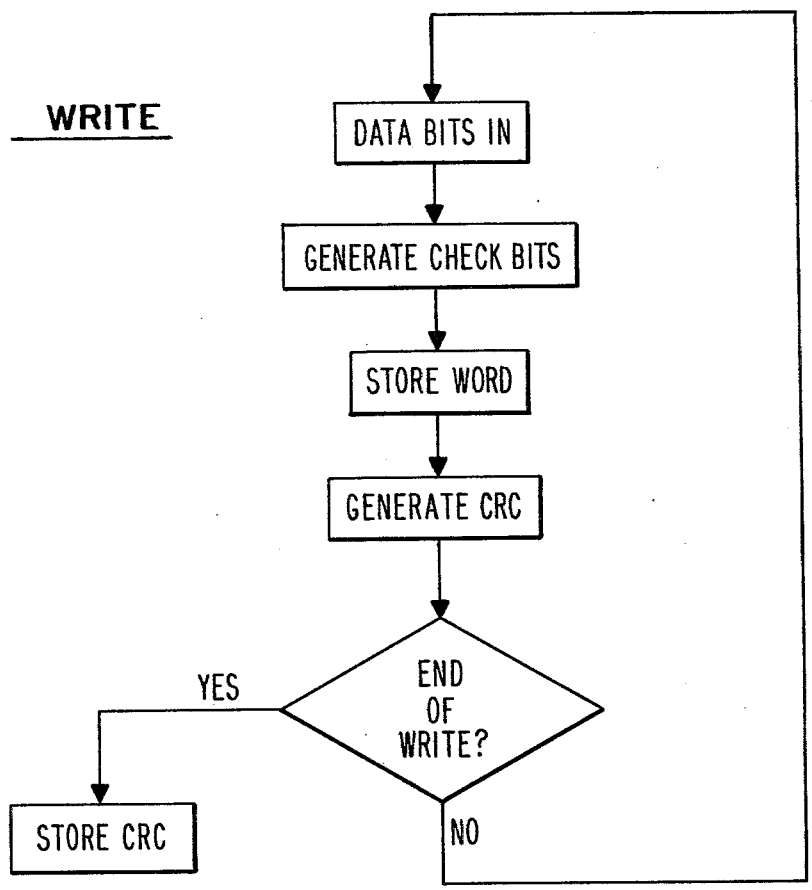
FIGS. 5a and 5b, represents a flow chart representing the error correction process according to the invention.
Figure 5B:
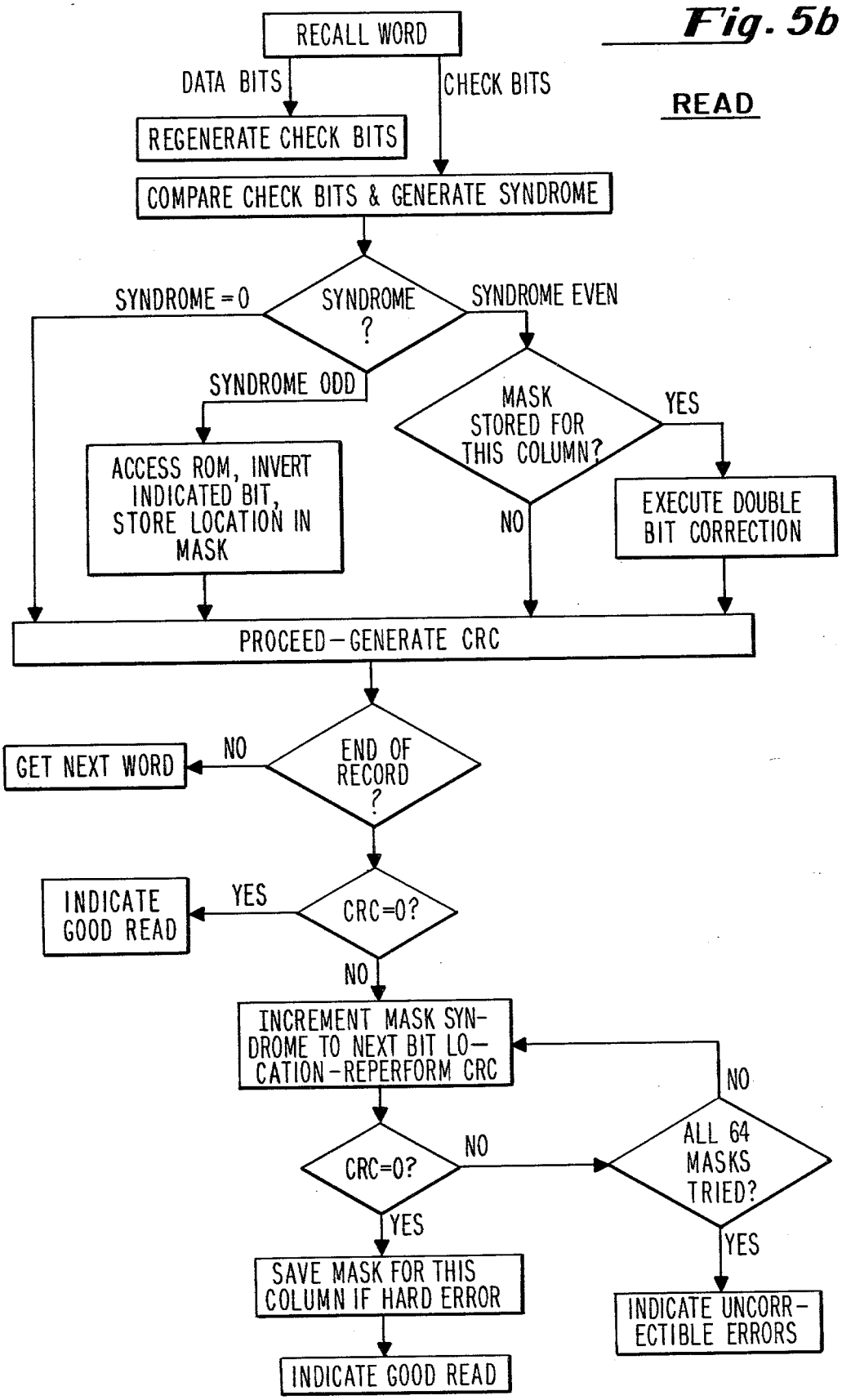

FIG. 5 shows a schematic flow chart of the error detection and correction process of the invention. It begins at the top of FIG. 5 with information data bits, in a preferred embodiment, 64 bits, being transmitted to the memory system of the invention by an external source, which may be a central processing unit. The first step is to generate 8 check bits corresponding to the 64 data bits according to, e.g., the Hamming error correction coding scheme, using the chart of FIG. 3. The next step is to store the word, comprising the 64 data bits and the 8 thus-generated check bits and to generate a cyclic redundancy character (CRC), and hold this in a separate register. During the write operation, the CRC division is performed, yielding 5 bytes of CRC data which are stored at the end of the record, this being the last step of the write operation. The read operation begins with the recalling of the word, again comprising both data and check bits, from the storage location, whether it be from the CCD storage array shown in FIG. 2 or from a random access memory of any of a number of well known types. At this time, the data bits are sent to a generator which generates check bits in the same manner as were the check bits generated during the write operation. The check bits generated during the write operation, however, are sent to a comparator which compares the newly generated check bits with the previously generated and stored check bits to determine whether the data has changed during the storage process. It will be apparent that if the data has not changed, both the newly generated and the old check bits should be identical. If they are not, clearly an error has occurred at some point during the storage or retrieval operation or during the period of storage. In a preferred embodiment, the comparison of the newly generated and the old check bits is done by an Exclusive-OR process, which may comprise a simple digital subtraction yielding an "error syndrome". It will be apparent to those skilled in the art that if the two sets of check bits are identical, the syndrome will be a row of zeros; in the preferred embodiment wherein eight check bits are generated, 8 zeros. If a single bit error has occurred, the output will be ones in an odd number of the eight locations of the syndrome. If an even number of errors has occurred, the result will be an even number of ones in the locations of the syndrome. Whether the syndrome is zero, odd or even forms the basis of the decision now made. If the syndrome is zero, as discussed above, it is clear that no error has occurred. Therefore, the decision line leads to a block marked "Proceed-Generate CRC". If the syndrome is odd, a read only memory is accessed to determine which of the 64 bits is in error, according to the syndrome chart of FIG. 3. As discussed above, the syndrome is the result of a subtraction between two groups of 8 check bits each of which comprise sufficient combinations of ones and zeros to indicate one of up to 256 locations. Therefore, it is possible, having digital ones in an odd number of the eight bits of the syndrome, to determine where the error lies within the 64 bits. (It will be recalled that only odd numbers of asterisks appear in any of the 64 rows of the syndrome chart of FIG. 3.) This bit may then be inverted (since in a digital environment the only thing needed to specify the correction to be made to an error is its location) and the operation proceeds as before.

The location of the bit in error is stored in a mask register. This mask register may be representative of a group of locations within memory wherein every bit is in error because a solid state device has become permanently damaged. While the algorithm described above is capable of correcting this error every time it occurs within a word, it will be appreciated that there may be occasions when both this so-called hard error and in addition a so-called soft error may occur within the same data word. At this time, it is advantageous to know the location of a hard error, so that this bit may be inverted. Then the syndrome generated may be subtracted from the mask syndrome, indicating the location of a second error which may then be corrected. If, in fact, one of the two errors is the same as the preceding error location (that is, one of the errors is a repetitive, hard error) two bits may then be corrected within a single 64 bit word. This is the process shown in the box indicated by "syndrome even" in FIG. 5. There the mask syndrome is generated and compared with (e.g., subtracted from) the error syndrome and both bits indicated are inverted. The process then proceeds as before to generate the CRC. The decision is then made based on whether the end of the record has been reached. If not, the process is begun again, as indicated by "get next word". If the end of the record has been reached, then the CRC check is made. As discussed above, this involves dividing the data of the record by a long polynomial. The CRC characters generated during the write operation will have had a remainder stored in the last 5 bytes of the record. This remainder will have been read during the read operation and CRC division will have been performed on it during the read operation. If there have been no multiple errors during the read operation, the remainder will be cancelled out by the division and CRC will be equal to zero. Thus the read operation comprises the mathematical inversion or complement of the write operation. If the result is zero, then the fact of a good, i.e. error-free, read operation is indicated to the central processing unit of the computer system. If not, this is an indication that multiple errors have occurred and this message may instead be indicated to the central processing unit of the computer.

Such multiple errors may arise in a variety of ways. For one, more than two errors may occur in a given word. According to the present invention, this is not corrected for the reason that it is an extremely rare occurrence and would require a vast amount of additional data storage in order to provide sufficient check bits to correct for such multiple errors. As discussed above, the provision of a mask register allows two errors to be corrected in a given record if one of those is in the same location within the word as was the previously corrected error, which is common where a given solid state chip device fails. An alternative is to tentatively replace the mask location with the syndromes corresponding to each bit of each word, inverting the thus-indicated bit; and reperforming the CRC calculation; this allows multiple soft errors to be corrected. Such a process requires considerable time; however, it is unusual for two soft errors to occur in a single word, and in some cases this optional process may be valuable. In this connection it will be apparent why it is desirable to store each of the bits of a given word within a different solid state device; i.e., so that hard errors affect only one bit of each word. A second possibility of multiple uncorrectable errors arises where three or more errors occur within a given word. However, as discussed above, it is relatively unusual for more than two soft errors to be present in a given word and so this risk is deemed acceptable, in light of the costs involved in correcting for more than two soft errors within a given word.

Figure 6:
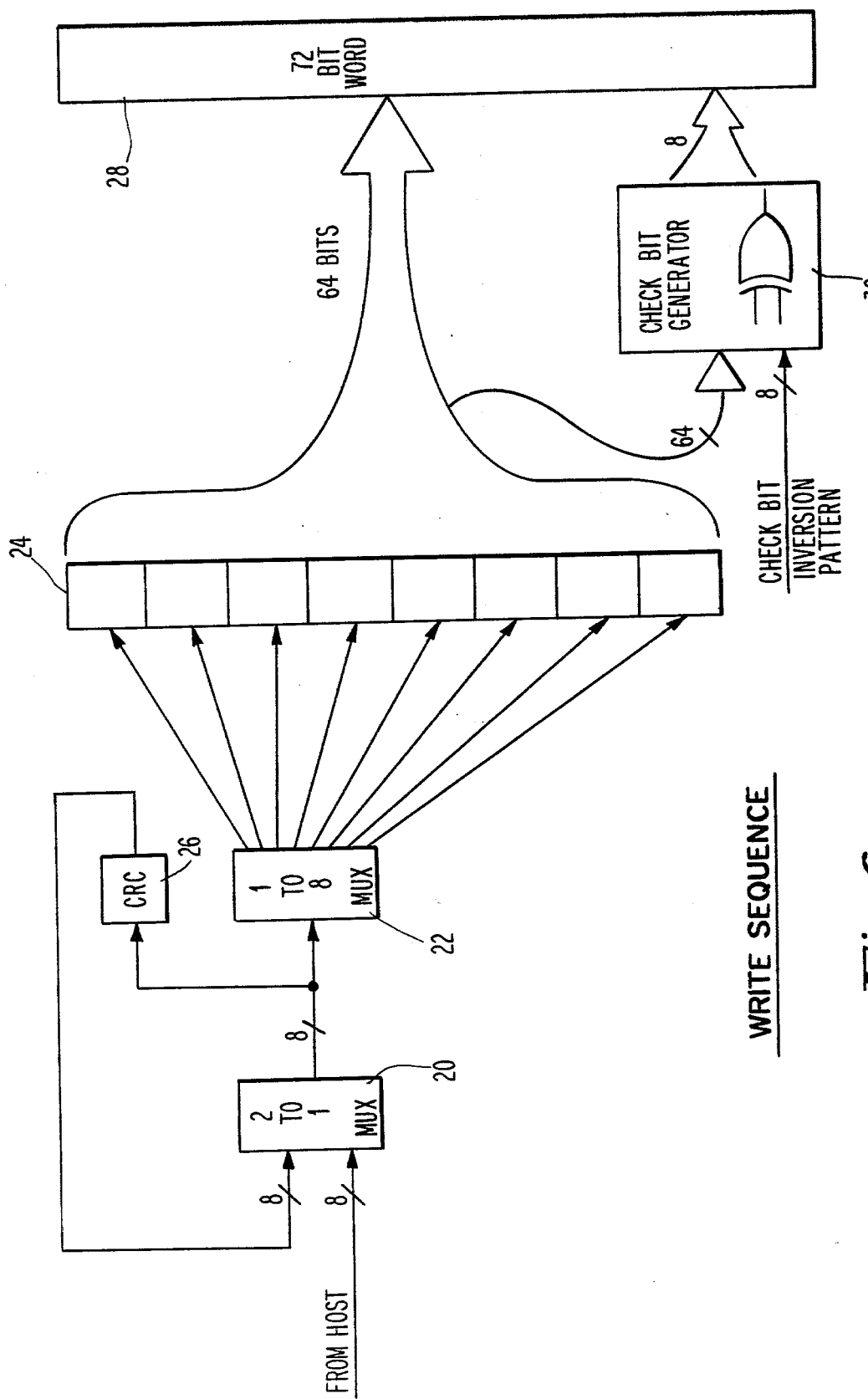
FIG. 6 represents a hardware embodiment for the writing process.

Referring now to FIG. 6, a hardware embodiment allowing performance of the write sequence shown in FIG. 5 is illustrated. Data is passed from a host computer (not shown) via an 8 channel bus (in both FIGS. 6 and 7, the use of a number, here 8, together with a slash across a data line indicates the width or number of bits of the channel represented thereby) into a two to one multiplex block 20. The data is then passed to a one to eight multiplex block 22, then to a 64-bit data register 24 whereby a 64 bit, eight byte word may be generated. The data is also passed from multiplexor 20 to a CRC generation unit 26 which, as described above, generates a CRC character during the write operation. The CRC character thus generated is passed to two to one multiplex box 20 and is accumulated during the write operation. The 64 bit word thus generated becomes part of a 72 bit word indicated schematically at 28. The 64 bits are also passed through a check bit generator 30 which, as discussed above operates upon 64 data bits to generate eight check bits, according to a Hamming error code in a preferred embodiment. This check bit generator 30 may comprise an exclusive-OR process operating according to the syndrome chart shown in FIG. 3. A check bit inversion pattern may also be passed to check bit generator 30 at which time certain of the check bits generated may be inverted for purposes discussed below.

Moving on to FIG. 7, the read sequence of operations is shown. The 72 bit word comprising 64 data bits and eight check bits is shown being divided in a 64 bit register 32 and an eight bit register 34. The 64 data bits are once again passed to a check bit generator 36 at which time eight new check bits are generated. Again, the check bit inversion pattern may be applied in order to cancel out any inversions performed during the write sequence. The old check bits, from register 34, and the new check bits from check bit generator 36 are then passed to comparator 38, which, as in the case of the check bit generator 36, may comprise an exclusive-OR unit of well-known type. The results of the comparison operation, eight syndrome bits, are passed through a read only memory (ROM) 40 which indicates the location of any errors in the data. This result, termed "correction vector for a new error" is passed to another exclusive-OR process 42 for correcting the data, the data having been demultiplexed, or reserialized, in an eight to one multiplex unit 44. If the syndrome produced by the comparator 38 indicates a plurality of errors in the data, this syndrome is passed to a mask register 46 which accesses a second read only memory 48 which provides a second error message, termed "correction vector for old error" to correction stage 42. The thus-corrected data is then passed to the host computer for use. At the same time a CRC character is generated and held in a CRC register 50, for utilization at the end of the reading of a given record in the manner described above.

It will be appreciated that there are a variety of modifications which can be made to the present invention. Specifically, the CCD memory devices disclosed may be replaced by other forms of memory, including random access memory. Another possibility of use is in the case when entire words are stored in a single device, possibly a magnetic-core memory. As long as data records are organized into words and records the invention is expected to provide utility. Further, it will be appreciated that the broad concept of the invention—that is, providing parity dependent check bits vertically with each word and also horizontally over the whole record provides a method whereby multiple errors may be detected and noted. It appears that the orthogonality may be extended to n-dimensional application, for still more powerful error detection methods. Moreover, it will be appreciated that the provision of Hamming-coded bits, suitable logic and a mask register allows hard errors to be corrected relatively simply without providing a quantity of check bits and associated logic sufficient to correct two errors within a given word so that two errors may be corrected in the vast majority of the circumstances where they arise.

Another possibility is that the method of the invention may be utilized other than during read operations. Specifically, from time to time the memory may be "purged", that is, examined for errors which may then be corrected, so that if soft errors occur over time, they may be corrected before two or more soft errors occurr within a given word which would tend to increase the chances of incorrectability. A further possibility is that it may be desirable to invert certain bits at certain times for various purposes. For example, four of the check bits may be inverted during the write operation and reinverted during the read operation so as to prevent all zeros in the check bit locations for data fields which are all zeros or all ones which might tend to lead to some confusion. Further, it will be realized that the CRC character is also useful to check that a field was correctly read in terms of its length and orientation since it will provide an indication of a gross error in these circumstances. Further, it will be realized that output means may readily be connected to the mask register to indicate both a location of continuously repeated hard single bit errors, so that a solid state device which has been permanently damaged may be replaced, and also may be used to indicate the presence of such soft errors for various diagnostic purposes. Finally, it will be understood that various modifications and improvements to the invention may be made and that the preferred embodiment described above should therefore not be construed as a limitation on the scope of the invention which is more properly defined by the appended claims.

We claim:

1. Method of detecting errors in digital data, said data being stored as an array of bits, said array having orthogonal extension in at least two dimensions, wherein the improvement comprises generating first parity-dependent check bits in each of said dimensions during the writing of said data into said array; regenerating comparable second check bits in each of said dimensions during the reading of said data from said array; comparing said first and second check bits in at least one of said dimensions to generate an error syndrome; inverting bits identified as in error by said syndrome; and comparing said first and second check bits in the remaining of said dimensions, thus determining whether said inverting eliminated errors from said array.

2. The method of claim 1, wherein said check bits are generated in at least one of said dimensions according to a Hamming code.

3. The method of claim 1 wherein said check bits are generated in at least one of said dimensions according to a cyclic redundancy code.

4. The method of claim 1 comprising the additional step of storing the location of an inverted bit in a first word for identifying a bit in error in a second word.

5. The method of claim 1 further including the step of providing an indication of the accuracy of the reading of said data.

6. Method for detecting and correcting errors in stored digital data, said data being organized into records each comprising at least one word, each word consisting of information bits and stored check bits, comprising the steps of:
generating check bits corresponding to each word;
comparing said generated check bits with said stored check bits;
if a single-bit error is indicated by said comparison, inverting a bit indicated as in error and storing the location of said bit in a data register;
if a double-bit error is indicated by said comparison, inverting the bit stored at the location defined by the contents of said data register, and inverting a second bit indicated as in error;
performing a cyclic redundancy check; and
providing an indication of reading accuracy based on the results of said check.

7. The method according to claim 6 wherein said check bits are generated according to a Hamming code.

8. The method according to claim 6 wherein the step of comparing said generated and stored check bits is performed on each word of data.

9. The method according to claim 8 wherein said step of comparing is an exclusive-OR logical process.

10. The method according to claim 6 wherein the steps of indicating bits as in error are performed by accessing a read-only memory, having stored therein addresses of the bits of each word.

11. The method according to claim 6 wherein the steps of indicating bits as in error comprise completing a preset sequence of logical instructions.

12. Method of storage of digital data, said data being organized into at least one record comprising at least one word, comprising a read stage and a write stage, the write stage including the following steps:
generating a first plurality of check bits uniquely corresponding to each word of data; and
storing said first plurality of check bits in conjunction with said word;
said read stage including the following steps:
generating a second plurality of check bits uniquely corresponding to each word of data;
comparing said first and second pluralities of check bits to generate an error syndrome;
if said syndrome is zero, proceeding with said read operation;
if said syndrome is odd, using it to identify a single bit of said word which is in error, inverting said bit, and proceeding with said read operation;
if said syndrome is even, comparing it with the contents of a mask register to generate a second error syndrome, using said syndromes to identify two bits in error and inverting said bits; and, when the last word of said record has been read, providing a representation of whether or not said read operation has been performed without errors.

13. The method according to claim 12, wherein said check bits are generated according to a Hamming code.

14. The method according to claim 12, wherein the identification of bits to be inverted is performed according to a predetermined series of logical steps.

15. The method according to claim 12 wherein the step of identifying bits to be inverted comprises accessing a read-only memory having the addresses of said bits stored therein.

16. The method of claim 12 further comprising the step of storing each bit of a given word in a different solid-state memory device.

17. The method of claim 16 wherein said devices are charge-coupled devices.

18. The method of claim 16 wherein said devices are random-access memory devices.

19. The method of claim 16 wherein the bits of a given word are each stored at the same location of the devices within which the individual bits are stored.

20. The method of claim 16, wherein the contents of said mask register is used to identify a defective one of said devices.

21. The method of claim 12 wherein said step of providing a representation of whether the read operation has been performed without errors comprises a cyclic redundancy check method.

22. The method of claim 21 wherein said cyclic redundancy check method comprises generating a plurality of parity-dependent bytes of data, said step being partially performed after the writing of each word, and storing said parity-dependent bytes as part of said record.

23. The method of claim 22 wherein said representation of whether the read operation has been performed without errors is provided by an operation performed on said record, including said parity-dependent bytes, during said read stage, said operation comprising the performance of a mathematical complement of said step of generating parity-dependent bytes.

24. The method of claim 12, further comprising the step of inverting certain of said check bits prior to storing said bits, and reinverting said certain bits prior to said comparing step, whereby at least some of the bits of each word are non-zero.

* * * * *